United States Patent [19]

Tomori

[11] 4,413,893
[45] Nov. 8, 1983

[54] INTERCHANGEABLE LENS BARREL

[75] Inventor: Yasumasa Tomori, Sakado, Japan

[73] Assignee: Asahi Kogaku Kogyo Kabushiki Kaisha, Tokyo, Japan

[21] Appl. No.: 267,696

[22] Filed: May 27, 1981

[30] Foreign Application Priority Data

Jun. 11, 1980 [JP] Japan .................................. 55-78858

[51] Int. Cl.³ .......................... G03B 3/10; G02B 7/04
[52] U.S. Cl. .................................. 354/195; 350/255; 354/286
[58] Field of Search ................ 354/25 R, 25 A, 25 P, 354/25 N, 195, 197, 198, 286; 352/140, 142; 350/255

[56] References Cited

U.S. PATENT DOCUMENTS 3,984,846 10/1976 Gallagher et al. ............... 354/25 A
4,323,303 4/1982 Enomoto ............................. 354/25

Primary Examiner—William B. Perkey
Attorney, Agent, or Firm—Michael B. Lasky

[57] ABSTRACT

An interchangeable lens barrel comprising a lens barrel having a mount which can be attached to a mount of a camera body, focussing lens means rotatably supported on the lens barrel and moving in directions of the optical axis when it rotates, a driving motor, a driving mechanism connected to the driving motor for rotating the focussing lens means, and means on the mount of the lens barrel for receiving a driving signal of the driving motor from the camera body.

8 Claims, 8 Drawing Figures

INTERCHANGEABLE LENS BARREL

This invention relates to an interchangeable lens barrel in which focussing lens means can be moved forwards and backwards by a driving motor and particularly to an interchangeable lens barrel suitable for use with an automatic focussing camera in which a motor for driving focussing lens means operates in response to a driving signal from a camera body to which the lens barrel is mounted.

There is known a camera in which focussing lens means provided in an interchangeable lens barrel is driven by a control device provided in a camera body. The control device typically includes a focus detecting device which detects the focal point of the focussing lens means to move the latter in order to focus an image on the focal plane, i.e., on the film plane. The control signal from the focus detecting device is fed to a manual focus indicator which makes a lamp in a finder ON or OFF. The control signal is also fed directly or by means of a switch, to the driving motor for the focussing lens means, so that automatic focussing can be effected. It is however necessary to provide a cable on the lens barrel in order to receive the control signal from the camera body. The connection between the cable and the camera body must be effected independently of the connection between the lens barrel and the camera body, which gives inconvenience to an operator. Furthermore, there is a possibility that the cable is damaged or broken by means of an unexpected obstacle when an operator carries the camera or an operator takes a photograph. In addition to this possibility, the known lens barrel can only receive the control signal or the driving signal from the camera body and cannot feed any signal back to the camera body.

The primary object of the present invention is to provide a lens barrel which can automatically establish a signal transmitting and receiving circuit between the lens barrel and a camera body when the lens barrel is mounted to the camera body.

The secondary object of the present invention is to provide a lens barrel which can feed back to the camera body information, such as information that the focussing lens means are located at a shortest object distance or at an infinite object distance.

Another object of the present invention is to provide a zoom lens barrel which has a zooming barrel and which can provide a signal transmitting and receiving circuit between the lens barrel and the camera body, independently of the axial position of the zooming barrel which is displaced.

Still another object of the present invention is to provide optimum characteristics of operation of the focussing lens means in different interchangeable lenses which have different total displacements or different displacement per unit of angular rotation of the focussing lens means.

In order to achieve the objects of the present invention, mentioned above, according to the present invention, the lens barrel has a mount which is detachably connected to a mount of the camera body and which is provided with signal transmitting and receiving means for the driving motor of the focussing lens means. The signal transmitting and receiving means can be adapted not only to transmit the driving signal from the camera body to the driving motor, but also to feed a signal that the focussing lens means on the lens barrel are located at a shortest object distance or at an infinite object distance, back to the camera body.

The invention will be discussed below in detail, with reference to the accompanying drawings in which;

FIGS. 1 and 2 show a zoom lens system including two groups of lenses, according to the present invention. The lenses are located at the longest focal length position and the shortest focal length position in FIGS. 1 and 2, respectively.

Figure 7:
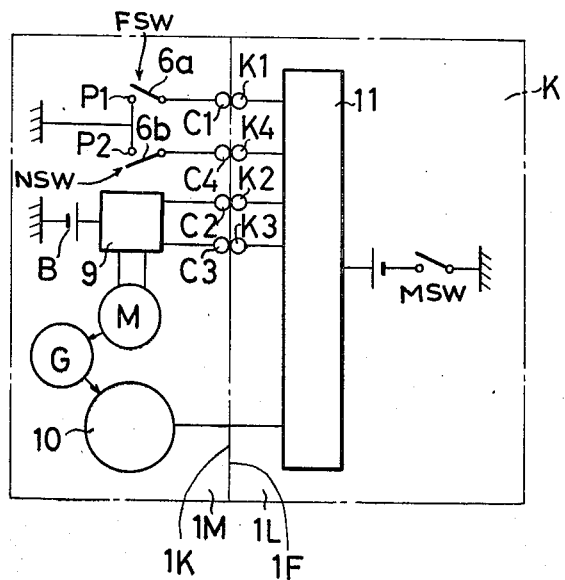
FIG. 7 is a schematic view of a control circuit provided between the camera body and the lens barrel.

A mount securing barrel 1 has a mount 1M which can be connected to a mount 1L of a camera body K (FIG. 7). A zooming barrel 4 is movably supported on the stationary barrel, i.e., the mount securing lens barrel 1 so that the zooming barrel can slide on the stationary barrel only in directions of the focal axis. In the zooming barrel 4 is screwed a front lens barrel 2 carrying a group of front lenses which are focussing lenses, by means of helicoid H. The zooming barrel 4 has a lower ridged portion 4a integral therewith, in which a driving motor M and a gear mechanism (gear train) G which is rotated by the driving motor M are arranged. The gear train G has a terminal output gear G1 which is engaged by a peripheral gear 2g on the front lens barrel 2. The width of the gear 2g is such that the gear 2g always engages with the terminal output gear G1 even when the front lens barrel moves in the focal axis direction to focus the focussing lens means.

A rear lens barrel 3 which carries a group of rear lenses is slidably fitted in a driving barrel 8 which is rotated at its fixed axial position in accordance with the axial displacement of the zooming barrel 4 without moving in the optical axis direction. The rotation of the driving barrel 8 causes the rear lens barrel 3 to move in the axial direction while preventing the rear lens barrel from rotating by the stationary lens barrel 1. The displacement of the rear lens barrel 3 has a predetermined relationship to the axial displacement of the front lens barrel 2, so that the focal length of the front and rear lenses varies.

In the zooming barrel 4 is rotatably supported a distance ring 5 which has an axial groove extending parallel to the focal axis. The front lens barrel 2 has a projection 2P which is fitted in the axial groove so that the front lens barrel rotates together with the distance ring 5. On the outer periphery of the distance ring 5 is provided an indicating portion of a scale of the object distance, which scale is visible through a window opening 4W formed in the zooming barrel 4.

Figure 1:
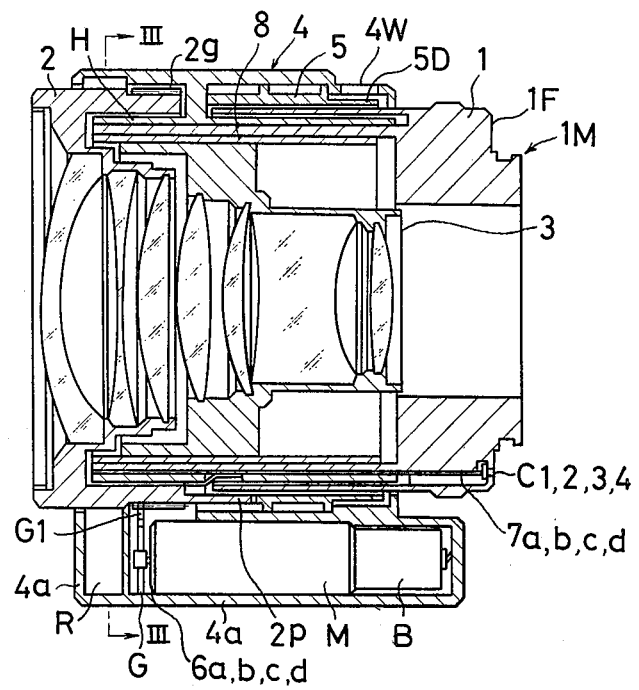
FIGS. 1 and 2 are longitudinal sectional views of an interchangeable lens barrel according to an embodiment of the present invention, shown in different positions.
Figure 2:
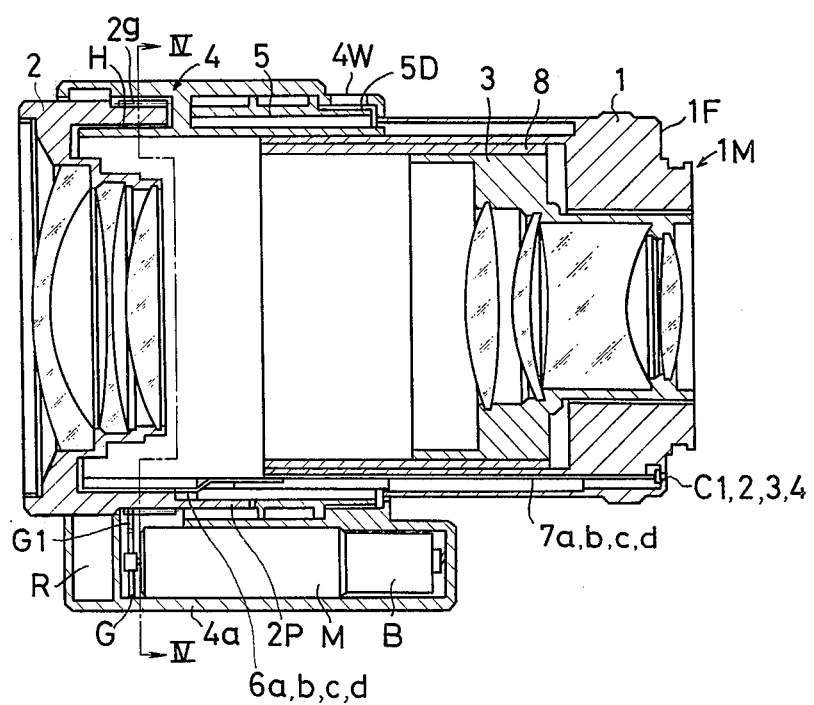
Figure 3:
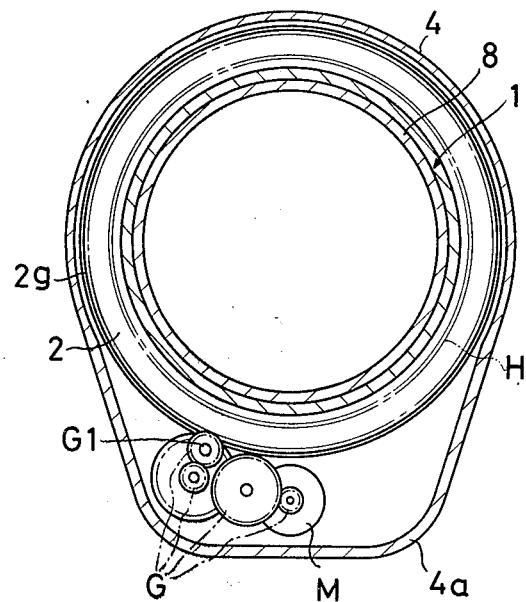
FIG. 3 is a sectional view taken along the line III—III in FIG. 1.
Figure 5:
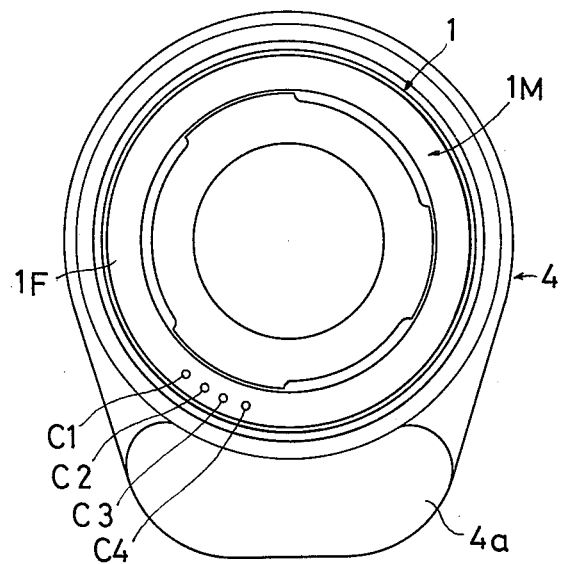
FIG. 5 is a right side elevational view of FIG. 1.
Figure 6:
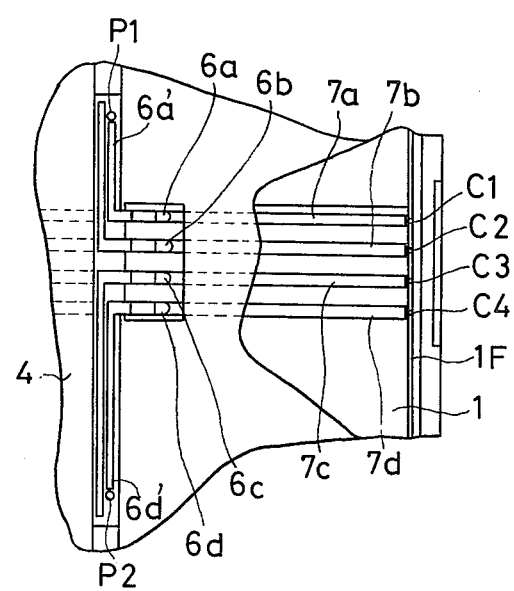
FIG. 6 is a developed view of brushes and lead plates, viewed from the direction designated by an arrow VI in FIG. 4.

In order to give the drive signal from the stationary barrel 1 to the driving motor M of the zooming barrel which axially moves, brushes 6a, 6b, 6c and 6d are secured to and insulated from the zooming barrel 4, and lead plates 7a, 7b, 7c and 7d which come into contact with the brushes 6a–6d, respectively are secured to and insulated from the stationary barrel 1. The lead plates 7a–7d have elongated band plate extending in the direction of the focal axis so that the lead plates are always in contact with the corresponding brushes of the zooming barrel 4 which moves in the axial direction, as shown in FIGS. 1, 2 and 6. The lead plates 7a–7d are connected, at their rear ends, to connector pins C1, C2, C3 and C4 which are provided on and insulated from a mount or flange surface 1F of the stationary barrel 1, respectively, as shown in FIGS. 5 and 6.

The connector pins C1–C4 are connected to corresponding connector pins K1–K4 on a mount surface 1K of the camera body K respectively, when the lens barrel is attached to the camera body K by means of the mount 1M (FIG. 5) of the lens barrel and the mount 1L of the camera body K, as shown in FIG. 7. The connector pins C2 and C3 which are connected to the connector pins K2 and K3 of the camera body K are adapted to receive signals from a control device, i.e, a focus detecting device 11 (FIG. 7) on the camera body K and to transmit the signals to a control circuit 9 of the driving motor M, through the lead plates 7b and 7c, and the brushes 6b and 6c, respectively. On the other hand, the connector pins C1 and C4 are adapted to give signals which represent the front terminal position and the rear terminal position of the front lens barrel 2 which moves to focus the front lenses, to the focus detecting device 11.

Figure 4:
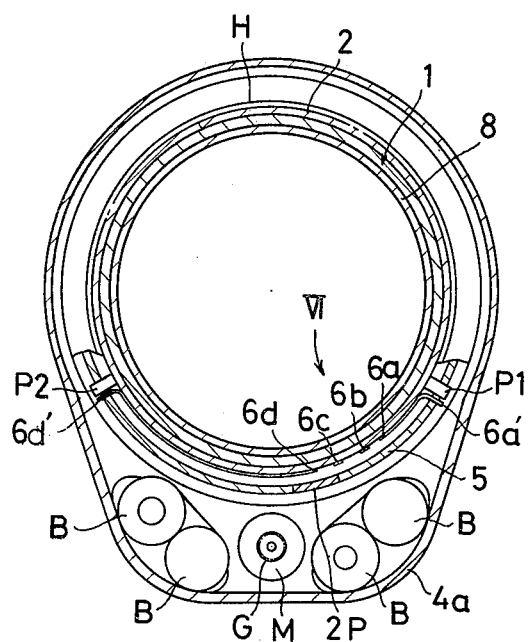
FIG. 4 is a sectional view taken along the line IV—IV in FIG. 2.

As shown in FIGS. 4 and 6, on the zooming barrel 4 are provided projecting pins P1 and P2 which are engaged by the projection 2P to limit the rotational movment of the front lens barrel. The brushes 6a and 6d have legs 6a' and 6d' extending therefrom which are opposed to and normally spaced from the corresponding pins P1 and P2 at a small distance, so that the pins P1 and P2 are normally not in contact with the legs 6a' and 6d'. When the front lens barrel 2 is rotated, the projection 2P comes into engagement with one of the pins P1 and P2, so that the projection 2P pushes the leg 6a' or 6d' of the brush 6a or 6d to cause the leg 6a' or 6d' to come into contact with the pin P1 or P2. Thus, the position of the front lens barrel 2 which is located at the infinite object distance or at the shortest object distance can be detected. An infinite object distance detecting switch FSW which comprises the pin P1 and the brush 6a and a shortest object distance detecting switch NSW which comprises the pin P2 and the brush 6d are thus provided in the lens barrel, as shown in FIG. 7.

Figure 8:
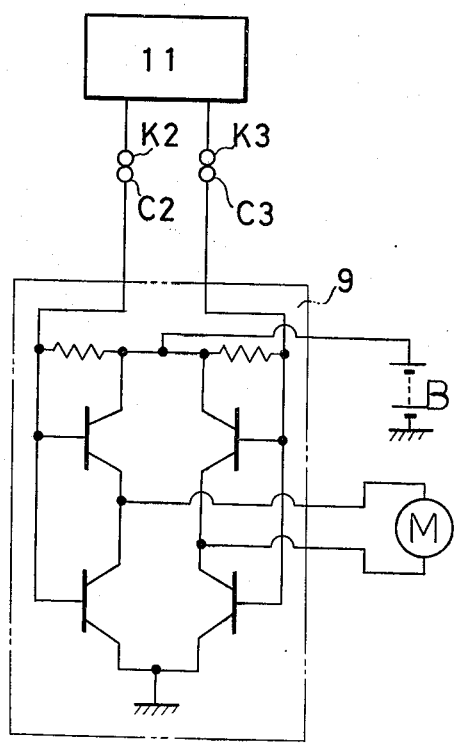
FIG. 8 is a diagram showing a control circuit of the driving motor.

The control circuit 9 of the driving motor M comprises a bridge circuit per se known for driving and reversing the motor M in accordance with signals from the terminals C2 and C3, as shown in FIG. 8.

The control circuit 9 of the driving motor M is arranged in a circuit chamber R formed in the lower ridged portion 4a of the zooming barrel. An electric power supply (battery) B for driving the driving motor M and the control circuit 9 is arranged in the rear portion of the ridged portion 4a. When different lens barrels have therein respective different control circuits 9 and respective batteries B, the driving motor can be driven in an optimum way suitable for respective optical systems.

FIG. 7 shows an example of an electrical circuit which is provided when the lens barrel of the present invention is mounted to a camera body which includes therein a focus detecting device 11. In FIG. 7, when a main switch MSW in the camera body K is turned ON, the focus detecting device 11 detects an image formed by the focussing lens means 10 (which includes the front and rear lenses in FIG. 1) and gives a signal for indicating the direction of the movement, i.e., the rotation of the front lens barrel 2 to focus the latter, to the connector pins K2 and K3 of the camera body K. This signal is transmitted to the connector pins C2 and C3 of the lens barrel and is then supplied to the motor control circuit 9 through the lead plates 7b, 7c and the brushes 6b, 6c. The control circuit 9 causes the motor M to rotate or reverse in response to the signal, so that the front lens barrel 2 is rotated by means of the gear train G and the gear 2g. The rotation of the lens barrel 2 causes the axial displacement of the barrel itself by means of the helicoid H. When focussing is completed, the lens barrel 2 stops. When the front lens barrel 2 is stopped, the distance ring 5 which rotates together with the front lens barrel 2 is also stopped. At this time, the graduations of the object distance appear in the window opening 4W. The focus detecting device 11 is per se known and is disclosed for example in U.S. Pat. No. 4,045,804. The present invention is not directed to the construction of the focus detecting device.

When the front lens barrel 2 is moved to, for example, the infinite object distance position (rear terminal position), the infinite object distance detecting switch FSW which comprises the brush 6a and the pin P1 detects the movement of the front lens barrel to feed a signal to the focus detecting device 11 through the connector pins C1 and K1. The signal of the shortest object distance (front terminal position) of the front lens barrel is fed to the focus detecting device 11, by means of the shortest object distance detecting switch NSW, and the connector pins C4 and K4, similarly to the detection of the infinite object distance.

The focus detecting device 11 gives a control signal to the control circuit 9, in accordance with the input signal. That is, for example, when the main switch MSW is turned ON to photograph an object which is located at a short distance, and when the focussing lens means of the lens barrel is located at the infinite object distance, a control signal is fed to the control circuit 9 so that the driving motor causes the focussing lens means 10 to be automatically rotated toward a finite object distance. Alternatively, in case where the focussing lens means is located at the shortest object distance position, and when the main switch is turned ON to photograph an object which is located at a shorter distance, a control signal is fed to the control circuit 9 so that the driving motor M is not driven and an indicator in the finder indicates that the object is out of a predetermined range of the object distance in which the object can be photographed. When the object is located within the range, a control signal is fed to the driving motor to move the focussing lens means toward the infinite object distance position. The feed back of the output of the device detecting the displacement of the focussing lens means, to the camera body makes it possible to control the driving motor M in an optimum way.

The focussing operation is effected also for the zooming barrel 4 which is located between positions shown in FIGS. 1 and 2, in the same way as mentioned above. That is, since the sliding contact terminal assembly consisting of the brushes 6a–6d and the lead plates 7a–7d is alway kept at a contact position in which the brushes are connected to the lead plates, independently of the axial position of the zooming barrel 4, it is ensured that the transmitting and receiving operation of the control signals between the focus detecting device 11, the control circuit 9 and the detecting device of the displacement of the focussing lens means can be effected.

When the present invention is applied to an optical lens system other than a zoom lens, the optical lens system is considered to be entirely a focussing lens means. Therefore, in this consideration, the front lens barrel 2 and the rear lens barrel 3 are integrally connected to each other so as to provide a lens barrel assembly, and the zooming barrel 4, the driving barrel 8 and the mount securing barrel 1 are integrally interconnected so as to provide a barrel assembly. The lens barrel assembly is engaged in the barrel assembly by means of a helicoid H. In addition, the brushes 6a–6d and the lead plates 7a–7d are integrally interconnected. By this modification, the present invention is applicable to an optical lens system other than a zooming lens.

In the illustrated embodiment, the mount flange surface of the camera body K has thereon the electrical terminals which are connected to the signal transmitting and receiving means provided on the mount flange surface of the lens barrel, and accordingly, a focussing circuit between camera body and the lens barrel can be automatically completed when the lens barrel is mounted to the camera body. The signal transmitting and receiving means, such as terminals, connector pins or lead plates can be provided not only on the mount flange surfaces but also on any surfaces of the lens barrel and the camera body that are opposed to each other when the lens barrel is mounted to the camera body.

The "mount" referred to herein includes not only existing mounts in a conventional camera but also mount surfaces which are specially provided on the camera body and the lens barrel to put the signal transmitting and receiving means, on the mount surfaces.

The invention has been described in detail with particular reference to preferred embodiments thereof, but it will be understood that variations and modifications can be effected without changing the basic scope of the invention as described herein above.

I claim:

1. An interchangeable lens barrel comprising a mount securing lens barrel having a mount which can be attached to a mount of a camera body with a control device, focussing lens means rotatably supported on the mount securing lens barrel and moving in directions of the optical axis when it rotates, a driving motor, a driving mechanism connected to the driving motor for rotating the focussing lens means, a device for detecting front and rear terminal positions of the focussing lens means in the axial direction which axially moves when it rotates, and means on the mount of the mount securing lens barrel opposed to the mount of the camera body for transmitting and receiving signals between the driving motor, the detecting device and the control device of the camera body.

2. An interchangeable lens barrel according to claim 1, further comprising a stop associated with the detecting device to limit the front and rear terminal positions of the focussing lens means.

3. An interchangeable lens barrel according to claim 1 or 2, wherein the output signal of the detecting device is fed back to the control device of the camera body which gives the drive signal to the driving motor.

4. An interchangeable lens barrel according to claim 1 or 2, further comprising a zooming barrel which is axially movable relative to the mount securing lens barrel and which supports the focussing lens means and the driving motor, and a plurality of slide contact terminals which are provided between the zooming barrel and the mount securing lens barrel and which are always interconnected, independently of the axial movement of the zooming barrel so that the driving motor, the detecting device and the signal transmitting and receiving means are always electrically interconnected.

5. An interchangeable lens barrel according to claim 4, wherein the zooming barrel comprises a control circuit which receives the driving signal from the camera body to control the driving motor, and a power supply for the control circuit and the driving motor.

6. An interchangeable lens barrel according to claim 1 or 2, wherein said signal transmitting and receiving means comprises a plurality of connector pins which are located on and insulated from the surface of the mount of the mount securing lens barrel that is opposed to and is brought into contact with a surface of the mount of the camera body.

7. An interchangeable lens barrel comprising a mount securing lens barrel having a mount which can be attached to a mount of a camera body, focusing lens means rotatably supported on the mount securing lens barrel and moving in directions of the optical axis when it rotates, a driving motor, a driving mechanism connected to the driving motor for rotating the focusing lens means, signal transmitting and receiving means for receiving a driving signal of the driving motor from the camera body, said signal transmitting and receiving means being provided on the portion of the mount of the mount securing lens barrel that is opposed to the mount of the camera body, and a zooming barrel which is axially movable relative to the mount securing lens barrel and which supports the focusing lens means and the driving motor, and a plurality of slide contact terminals which are provided between the zooming barrel and the mount securing lens barrel and which are always interconnected, independently of the axial movement of the zooming barrel to transmit a signal from the signal receiving means of the mount securing lens barrel to the driving motor.

8. An interchangeable lens barrel according to claim 7, further comprising a distance ring which is arranged in the zooming barrel in such a way that the distance ring rotates together with the focussing lens means and which is provided, on its outer periphery, with an indicating portion of the graduations of object distance.

* * * * *